Figure 1:
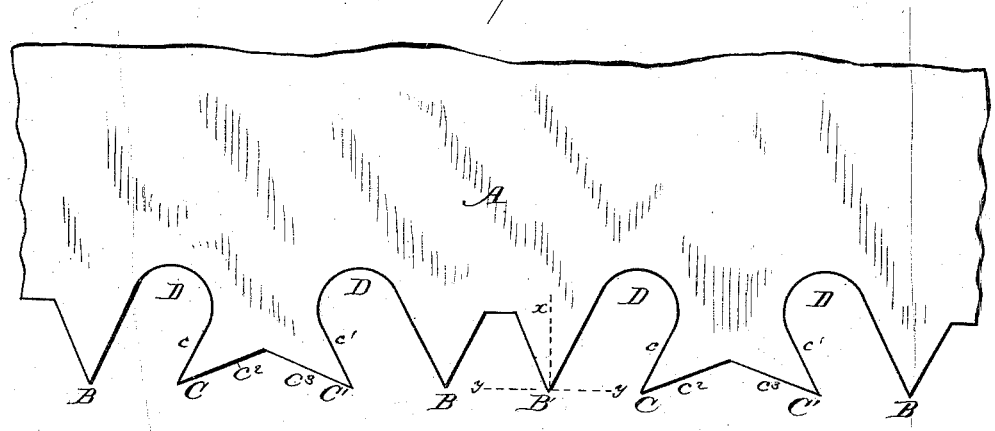

(No Model.)

J. J. PARKER.
CROSSCUT SAW.

No. 335,087. Patented Jan. 26, 1886.

WITNESSES:
J. W. Reynolds
E. A. Keyser

INVENTOR
John J. Parker
BY
ATTORNEY

UNITED STATES PATENT OFFICE.

JOHN J. PARKER, OF AITKIN, ASSIGNOR TO HENRY H. CORBETT, OF ST. CLOUD, MINNESOTA.

CROSSCUT-SAW.

SPECIFICATION forming part of Letters Patent No. 335,087, dated January 26, 1886.

Application filed June 15, 1885. Serial No. 168,673. (No model.)

*To all whom it may concern:*

Be it known that I, JOHN J. PARKER, a citizen of the United States, residing at Aitkin, in the county of Aitkin and State of Minnesota, have invented certain new and useful Improvements in Crosscut-Saws; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to drag-saws or crosscut-saws; and the novelty consists in the construction, arrangement, and adaptation of parts, as will be more fully hereinafter set forth, and specifically pointed out in the claims.

The invention belongs to that class of saws in which cutters or scoring-teeth serve to sever the wood fiber upon two planes, said planes delineating the side limits of the kerf. These cutters or scorers are arranged in sets of two, one being inclined to one direction and the other in the opposite direction, and between adjacent sets of these scorers are arranged chisel teeth, which follow the scorers and cut out the wood which lies between the two cuts thus made. The chisel-teeth are also arranged in sets of two, one facing in either direction, so that the saw will operate in either direction.

A revolution in this art was made by the construction invented by one Tuttle, who received a reissued patent for the main features thus far mentioned August 9, 1870. The device thus patented was of immense value to the public, and various improvements have been made.

In the art of sawing it is not only a desideratum to obtain the greatest depth of kerf with the least expense of power, but it is important that the saw shall be durable and be susceptible of being easily kept in repair.

I will base the invention as an improvement upon the Tuttle construction mentioned, for the reason that the faults which I seek to avoid are as apparent in that device as in any others known to me. I find that when the backs of the chisel-teeth deflect from the plane of the cutting-edge at an angle of thirty or more degrees (those in Tuttle's construction being about forty-five degrees) it is difficult to secure a sufficient incline to the chisels or planer-teeth without seriously affecting the strength and durability of the saw. In the Tuttle device, for instance, the points of the planer-teeth had very little body, and were quickly worn away. I bring the back or base line of my planer-teeth very much nearer a horizontal line— that is to say, much nearer parallel with the cutting-edge of the saw. This allows me to give to the planer-teeth a greater incline, and yet retain sufficient material in each to give it strength, approximately the same amount of material as is afforded the scoring-teeth. By this means the entire working-edge of the saw wears about evenly, and will last a long time. The material displaced by sharpening is equally divided between scorers and planers and along the entire working-edge of the saw; but to this feature is added a greater advantage. The front edge of each planer-tooth is on a parallel with the back edge of each adjacent scorer-tooth, and this allows both these lines to be carried up to a considerable distance in the body of the saw without affecting the strength of the saw, but adding materially to its efficiency by causing the dust-recess to be greatly increased.

With this brief statement of the material features of the invention, the same is illustrated in the accompanying drawings, which form a part of this specification, and in which—

Figure 2:
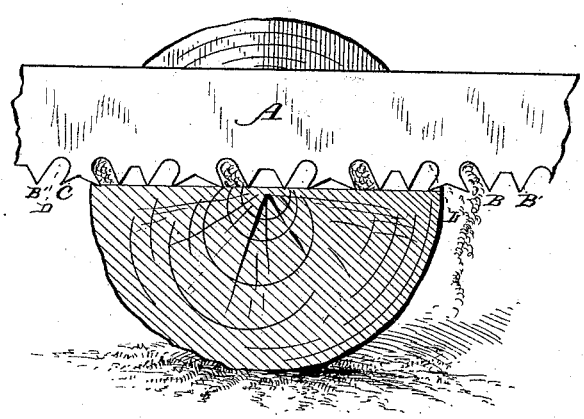

Figure 1 is a side elevation of a section of a saw made according to my invention. Fig. 2 illustrates the saw in operation, showing some of its advantages.

Referring to the drawings, A designates the saw-body, having scoring-teeth B B', arranged in groups of two, and having their sides or edges at an angle equidistant from a vertical line, or a line, $x$, drawn at right angles to the plane $y$ of the cutting-edge of the saw, the diverging angles being about forty-five degrees.

C C' designate the planer or chisel teeth, also arranged in groups of two, and with the groups alternating with the groups of scorers. The planer-teeth are arranged to point one in either direction, so as to operate efficiently with either stroke of the saw, and the back edge, $c^2$, of the planer C serves as a gage to determine the depth of cut of the tooth C', the back $c^3$ of the tooth C' serving similarly for the tooth C. Each planer-tooth is arranged so that its edges, as $c$ $c^2$, for instance, will diverge from the point at angles about forty or forty-five degrees from each other, so as to leave about the same amount of material in them as there is in the scorers; but the sides or edges $c^2$ $c^3$ approach very much nearer the plane $y$ of the cutting-edge of the saw—say, at an angle of fifteen degrees or twenty degrees from such plane. By bringing these edges $c^2$ $c^3$ thus close to the horizontal line $y$, I am enabled to give to these planers an incline which will make them efficient in taking out the severed wood from the kerf in the manner of a plane with a minimum of force, and am enabled also to provide each with an amount of material corresponding to the amount in the scorers B B', whereby the saw will wear evenly. By thus bringing the edges $c^2$ $c^3$ near a horizontal line I am enabled to carry the front edges, $c$ $c'$, of the planers about parallel with the adjacent edges of the scorers, and to carry these edges back into the body of the saw to form a shaving-recess, D. This recess D is of vast importance. Where the wood cut loose by the chisel-teeth is broken up into dust it seeks the edges of the kerf and materially affects the proper work of the scorers behind. With this recess D the planers cut loose a shaving, which rolls or coils up in the recess, and holds together until the saw leaves the log, when it drops in a long rope or shaving. With this construction as described I have by actual experiment reduced the number of strokes with a given force to saw a given distance from one hundred and fifty-eight to one hundred and eighteen. I attribute this greatly to the fact that the scorers have no dust to cut through, as in my experiments the wood cut loose by the planers leaves the saw in a whole shaving.

In my improved saw all the edges are of a corresponding length and straight, and the saw can be sharpened by an ordinary flat file. This is important over curved edges.

What I claim as new is—

1. A crosscut-saw having scoring-teeth and planer-teeth arranged in alternate groups of two, and having each approximately the same area of material, the front edge of the planers being arranged parallel with adjacent edges of the scorers, and the back edge arranged but slightly divergent from a horizontal, as set forth.

2. In a crosscut-saw, the dust or shaving recess D, formed in the body of the saw by continuing the parallel edges which constitute the backs of the scorers and the fronts of the planers, as shown, and for the purposes set forth.

3. The crosscut-saw described, having the scoring-teeth B B' and planer-teeth C C', arranged in alternate groups of two, all the teeth having the same area of material with straight edges, and the planers arranged with their front edges parallel with the back edges of adjacent scorers, the said edges being carried back to form shaving-chambers D, as set forth.

In testimony whereof I affix my signature in presence of two witnesses.

JOHN J. PARKER.

Witnesses:
A. I. BELT,
R. B. CORWEN.